United States Patent [19]

Bühren

[11] Patent Number: 4,535,893
[45] Date of Patent: Aug. 20, 1985

[54] SPOOL SEPARATING DEVICE

[75] Inventor: Heinz Bühren, Monchen-Gladbach, Fed. Rep. of Germany

[73] Assignee: W. Schlafhorst & Co., Monchen-Gladbach, Fed. Rep. of Germany

[21] Appl. No.: 572,206

[22] Filed: Jan. 19, 1984

[30] Foreign Application Priority Data

Jan. 19, 1983 [DE] Fed. Rep. of Germany ....... 3301588

[51] Int. Cl.³ .............................................. B07C 5/06
[52] U.S. Cl. .................................... 209/628; 209/666; 209/680; 209/920; 209/927
[58] Field of Search ............... 209/606, 539, 628, 659, 209/660, 666, 674, 680, 682, 920, 927; 198/391, 756, 757, 771

[56] References Cited

U.S. PATENT DOCUMENTS

| | | | |
|---|---|---|---|
| 2,964,182 | 12/1960 | Spurlin | 209/682 |
| 3,049,231 | 8/1962 | Crandall et al. | 209/927 |
| 3,378,139 | 4/1968 | Perry | 209/920 |
| 3,414,111 | 12/1968 | Ernest | 198/391 |
| 4,462,508 | 7/1984 | Grafius | 209/920 |

FOREIGN PATENT DOCUMENTS 0545536  2/1977  U.S.S.R. ............................ 209/659

Primary Examiner—Robert B. Reeves
Assistant Examiner—Donald T. Hajec
Attorney, Agent, or Firm—Herbert L. Lerner; Laurence A. Greenberg; Adam A. Jorgensen

[57] ABSTRACT

A spool separating device for separating spool tubes with a relatively smaller diameter from finished wound spools with a relatively larger diameter, includes a vibratory conveyor with a bottom, an upper end, a sliding surface extended spirally upward along a given spool transport direction from the bottom to the upper end, a wall outwardly bordering the sliding surface, the wall having a slot formed at a given location therein, the slot having a height being greater than the diameter of a spool tube and smaller than the diameter of a finished wound spool and a length being greater than the length of a spool tube, an adjustable wall section in a position bordering the top of the slot determining the height of the slot, the adjustable wall section being resiliently moveable out of the position in the event of spool jamming, and an additional wall section determining the depth of the slot and approaching the bordering wall in the given spool transport direction for guiding the end of a spool tube of a spool which cannot fit completely through the slot back onto the sliding surface.

6 Claims, 3 Drawing Figures

SPOOL SEPARATING DEVICE

The invention relates to a spool separating device in the form of a vibratory conveyor with a sliding surface rising from the bottom to the upper end thereof in the form of a three-dimensional spiral, and a wall bordering the sliding surface toward the outside which is provided at one location with a slot having a width which is greater than the diameter of a spool tube and smaller than the diameter of a finish wound spool, and a length which is greater than the length of a spool tube.

Spool separating devices are used to feed individual spools in a rapid sequence from a completely randomly unordered spool pile to a machine, such as a spool preparation station, a spool packing device, a spool cleaning device, or the like.

If the spool separating device is constructed in the form of a transport device for loose materials and in the form of a vibratory conveyor, it can receive a considerable number of spools in one feeding operation without spilling over. The vibratory impulses are generated in such a way that the spools travel upward on the spiral sliding surface. If this sliding surface is inclined not only toward the bottom of the spool separating device but also toward the outside, the spools cannot fall back toward the inside onto the bottom of the spool separating device as they travel. If the outside wall of the sliding surface is provided with a slot having a height which is greater than the diameter of a spool tube and smaller than the diameter of a finish wound spool, empty tubes or spools which are not sufficiently wound are separated out during the upward travel of the spools. Such spools fall through the slot into a storage container, for example. However, this type of operation can cause disturbances to occur. Insufficiently wound spools can jam in the slot, so that it becomes impossible to later separate out empty or insufficiently wound spools. A spool which is clamped in the slot can assume a position across the direction of travel and can become an obstacle. This obstacle causes all following spools to be blocked and rejected, so that the whole spool separating device becomes inoperative.

Spools which are in the form of spinning cheeses may have a sufficient diameter for further processing, but they may still have quite different diameters. The unwound end of the coil tube of such a spool may enter into the slot, and jam this otherwise useable spool in the slot.

It is accordingly an object of the invention to provide a spool separating device which overcomes the hereinafore-mentioned disadvantages of the heretofore-known devices of this general type, and to make certain that the separation of the individual spools, including the elimination of empty spool tubes and unuseable spools, is performed without malfunctions or jamming.

With the foregoing and other objects in view there is provided, in accordance with the invention, a spool separating device for separating spool tubes with a relatively smaller diameter from finished wound spools with a relatively larger diameter, comprising a vibratory conveyor with a bottom, an upper end, a sliding surface rising in a three-dimensional spiral upward along a given spool transport direction from the bottom to the upper end, a wall outwardly bordering the sliding surface, the wall having a slot formed at one given location therein, the slot having a height being greater than the diameter of a spool tube and smaller than the diameter of a finished wound spool and a length being greater than the length of a spool tube, an adjustable wall section in a position bordering the top of the slot determining the height of the slot, the adjustable wall section being resiliently moveable out of the position or out of the way in the event of spool jamming or a malfunction, and an additional wall section determining or bordering the depth of, the slot and approaching or being drawn nearer to the bordering wall in the given spool transport direction for guiding the end of a spool tube of a spool which cannot fit completely through the slot back onto the sliding surface or the spool separating device.

In accordance with another feature of the invention, the adjustable wall section is moveable transverse to the given spool transport direction.

In accordance with a further feature of the invention, the adjustable wall section is moveable toward the outside of the sliding surface or backward.

In accordance with an added feature of the invention, the adjustable wall section is moveable upward.

In accordance with a concomitant feature of the invention, the adjustable wall section is moveable out of a spool transport path in the event of spool jamming.

Other features which are considered to be characteristic for the invention are set forth in the appended claims.

Although the invention is illustrated and described herein as embodied in a spool separating device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
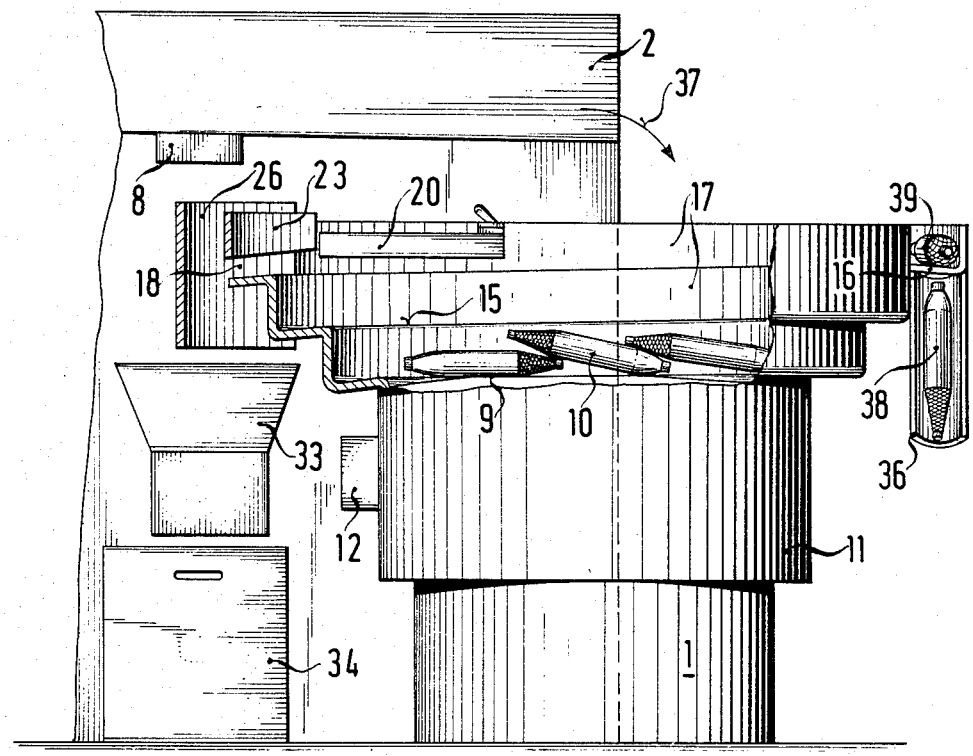
FIG. 1 is a fragmentary, diagrammatic, side-elevational view, partly broken away, of the device for separating individual spools, according to the invention.
Figure 2:
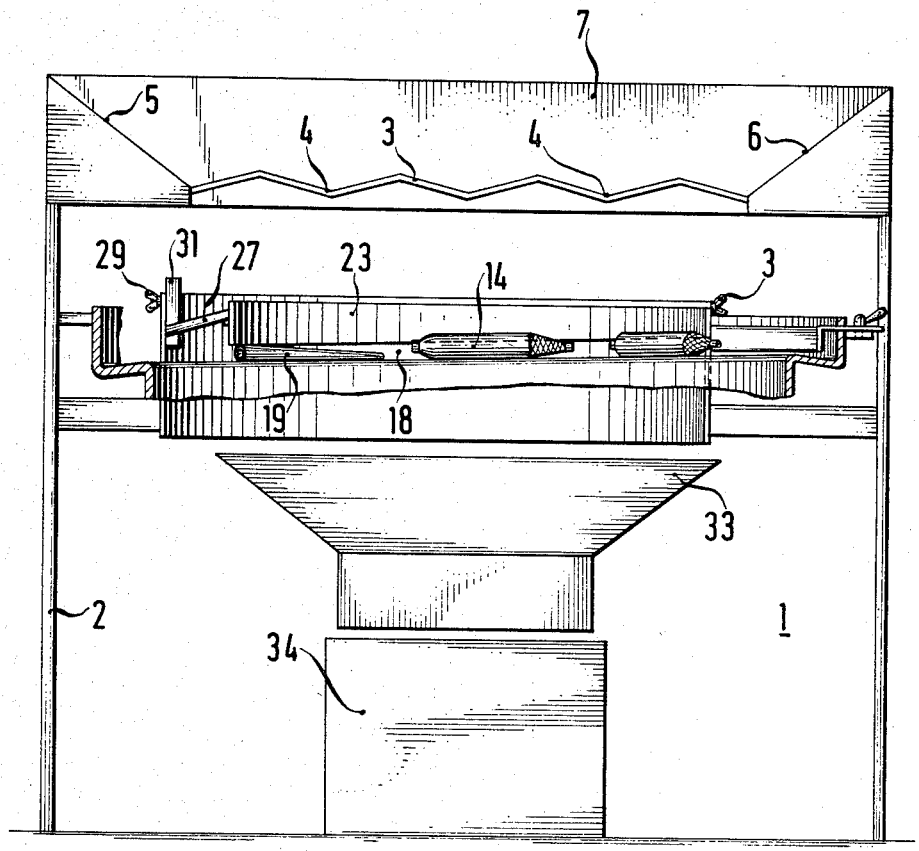
FIG. 2 is a front-elevational view, partly broken away, of the device of FIG. 1.

Referring now in detail to the figures of the drawing as a whole, it is seen that the spool or bobbin separating device is designated in general with reference numeral 1. A feeding device 2, which is constructed in the form of a flat conveyor for loose material, is disposed upstream of the spool separating device. As is especially clearly shown in FIGS. 1 and 2, a folded, roof-like bottom 3, which is bent in such a way that flat troughs 4 are formed, is disposed at the feeding device 2. Slanted side walls 5, 6, 7 are provided at the sides of the bottom 3. The feeding device 2 carries a vibrator 8 at its lower surface.

The spool separating device 1 is constructed in the form of a circular transporter for loose materials. This circular transporter has a slightly conical bottom 9 causing the spools or bobbins 10, which are in the form of spinning cheeses or cops, to slide or roll towards the side wall or rim. A vibratot 12 fastened to a lower cylindrical part 11 causes the spool separating device 1 to vibrate in the circumferential direction thereof, so that the motion in direction of the arrow 13 is always faster than the motion in the opposite direction. The result is that the spools located at the rim of the bottom 9 travel upward on a sliding or slipping surface 15 in a direction opposite to arrow 13. The sliding surface 15 rises from the bottom 9 up to the upper end 16 of the spool separating device 1 in the form of a three-dimensional spiral. The drawings show that the sliding surface 15 is inclined toward the outside. A spirally rising wall 17 is provided only at the outside of the sliding surface 15. Inside the device, spools which lie cross-wise or on top of each other can fall back into the spool storage area. The wall 17 has a slot 18 formed at a given location therein, having a height which is greater than the diameter of a coil tube 19 and smaler than the diameter of a finish-wound spool 14. An adjustable wall section 20 is provided near the upper end 16 of the sliding surface 15 in the wall 17, in order to radially limit the sliding surface 15 at the outside thereof. The adjustable wall section 20 determines the width of the sliding surface at this location. The adjustment of the wall section 20 is effected by a lug 21 which can be secured by an adjusting screw 22.

The slot 18 is bordered at the top thereof by an adjustable upper wall section 23, which determines the height of the slot. In case of a malfunction, the section 23 can move by spring action backward and/or upward out of the way.

The depth of the slot is limited by another wall section 26 which approaches the wall 17 in the direction in which the spools are transported. The section 26 guides the end of a coil tube 24 of a spool 25 back again into the spool separating device 1, when it does not completely fit through the slot 18.

The wall section 23 has an arched shape which follows the sliding surface 15. The front end of the wall section 23 is connected with the wall section 26 by a spring element 27 and a lug 31. An adjusting screw 29 serves the purpose of setting the relative height and securing the parts. The wall section 26 has an elongated slot 32 formed therein for the height adjustment. The back end of the wall section 23 is connected to the wall section 26 by a spring element 28 and an adjusting screw 30. The height adjustment of the wall section 23 is developed in such a manner that the slot 18 is about 2 mm higher at its back end than at its front end. Jamming of parts which barely fit the slot 18 is avoided in this way. With the aid of the slot 18, parts which have been separated out, as for example the coil tube 19, fall into a funnel 33 under which a collection container 34 is provided.

The wall section 26 is also arched and is disposed in such a way that the depth of the slot 18 decreases toward the end thereof, so that parts which are already in the slot 18, but cannot completely pass through the slot, are again guided completely back onto the sliding surface 15.

Figure 3:
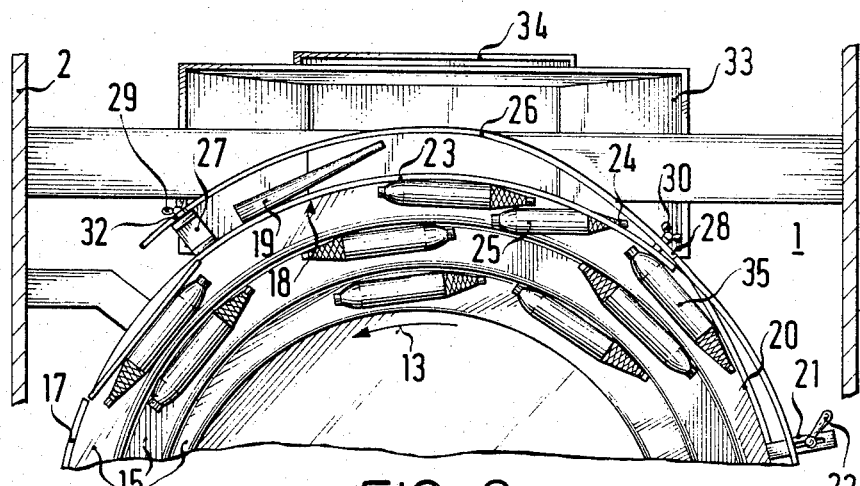
FIG. 3 is a fragmentary top plan view of the spool separating device.

FIG. 3 clearly shows that only individual spools 35 can pass along the wall section 20. Two spools which are positioned alongside each other cannot pass along the wall section 20. The second spool of a pair of spools alongside each other is rejected, and falls back onto a lower portion of the sliding surface.

A chute 36 is disposed at the upper end 16 of the sliding surface 15. The separated-out individual spools slide one after the other through the trough, and are transferred to a transporting device, such as a non-illustrated conveyor belt.

The device funtions as follows:

Initially spools are contained neither in the feeding device nor in the spool separating device. In order to prepare the spool separating device, the feeding device 2 is filled with non-illustrated spools. The two vibrators 8 and 12 are then started.

Since the feeding device 2 is constructed in the form of a flat transporter for loose materials, the spools are transported in the direction of an arrow 37, and fall singly or in small groups into the spool separating device 1.

The actual spool separating operation can therefore begin. The spools, which in this case are the spinning cheeses or cops, slide upward one after the other on the sliding surface 15, while spools or bobbins continue to be fed into the spool separating device 1. Unuseable spools or coil tubes or bobbins slide through the slot 18 and fall into the funnel 33. According to FIG. 1, the first spool 38 is already on the chute 36, followed by the second spool 39 which has just arrived at the upper end 16 of the sliding surface. The first, the second and the following spools then continuously slide over the chute 36.

If, contrary to expectation, an insuffidiently wound spool should become caught in the slot 18, this spool would be automatically released from its position, because the upper.wall section 23 would yield, and the spool would fall, pushed by the following spools, either into the funnel 33 or back onto the sliding surface 15.

The foregoing is a description corresponding in substance to German Application No. P 33 01 588.0, filed Jan. 19, 1983, the International priority of which is being claimed for the instant application and which is hereby made part of this application.

I claim:

1. Spool separating device for separating spool tubes with a relatively smaller diameter from finished wound spools with a relatively larger diameter, comprising a vibratory conveyor with a bottom, an upper end, a sliding surface extended spirally upward along a given spool transport direction from said bottom to said upper end, a wall outwardly bordering said sliding surface, said wall having a slot formed at a given location therein, said slot having a height being greater than the diameter of a spool tube and smaller than the diameter of a finished wound spool and a length being greater than the length of a spool tube, an adjustable wall section in a position bordering the top of said slot determining the height of said slot, said adjustable wall section being resiliently moveable out of said position in the event of spool jamming, and an additional wall section determining the depth of said slot and approaching said bordering wall in said given spool transport direction for guiding the end of a spool tube of a spool which cannot fit completely through said slot back onto said sliding surface.

2. Spool separating device according to claim 1, wherein said adjustable wall section is moveable transverse to said given spool transport direction.

3. Spool separating device according to claim 1, wherein said adjustable wall section is moveable toward the outside of said sliding surface.

4. Spool separating device according to claim 1, wherein said adjustable wall section is moveable upward.

5. Spool separating device according to claim 3, wherein said adjustable wall section is moveable upward.

6. Spool separating device according to claim 1, wherein said adjustable wall is moveable out of a spool transport path in the event of spool jamming.

* * * * *